United States Patent [19]
Afton et al.

[11] Patent Number: 5,971,702
[45] Date of Patent: Oct. 26, 1999

[54] ADJUSTABLE COMPRESSOR BUNDLE INSERTION AND REMOVAL SYSTEM

[75] Inventors: Brian W. Afton, Olean; Norman A. Samurin, Allegany, both of N.Y.; Hugh B. Carpenter, Shinglehouse, Pa.

[73] Assignee: Dresser-Rand Company, Olean, N.Y.

[21] Appl. No.: 09/089,686

[22] Filed: Jun. 3, 1998

[51] Int. Cl.[6] .............................. B23Q 3/00; F01D 25/00
[52] U.S. Cl. .................. 415/126; 415/118; 415/121.3; 415/128; 415/129; 415/131; 415/132; 415/213.1; 415/912; 29/888.011; 29/888.021
[58] Field of Search ................................ 415/118, 121.3, 415/126, 128, 129, 131, 132, 213.1, 140, 912; 29/888.011, 888.021, 464

[56] References Cited

U.S. PATENT DOCUMENTS

| | | | |
|---|---|---|---|
| 1,923,126 | 8/1933 | Tucker | 415/201 |
| 3,432,911 | 3/1969 | Rodgers | 29/464 |
| 3,493,212 | 2/1970 | Scalzo et al. | |
| 4,044,442 | 8/1977 | Carlson | 29/156.4 R |
| 4,925,363 | 5/1990 | Brown et al. | |
| 5,326,222 | 7/1994 | Matyscak et al. | |

*Primary Examiner*—Edward K. Look
*Assistant Examiner*—Matthew T. Shanley
*Attorney, Agent, or Firm*—Haynes and Boone, L.L.P.

[57] ABSTRACT

A rotary machine, such as a compressor, includes a casing having an annular cavity. The cavity is stepped to include a first circumferential surface of a first size and a second circumferential surface of a second size, less than the first size. At least one roller member is retractably mounted in the casing and is adjustable between a first position and a second position. In the first position, the roller member is retracted from the cavity and is substantially aligned with first circumferential surface. In the second position, the roller is extended into the cavity and substantially aligned with the second circumferential surface. When extended, the roller member can support a reduced diameter portion of a compressor bundle substantially in alignment with the second circumferential surface of the cavity during insertion of the compressor bundle into, or removal of the compressor bundle from the cavity in the compressor casing.

22 Claims, 9 Drawing Sheets

ADJUSTABLE COMPRESSOR BUNDLE INSERTION AND REMOVAL SYSTEM

BACKGROUND

The disclosures herein relate generally to compressors and more particularly to roller devices for assisting in the insertion and removal of a compressor bundle relative to a compressor casing.

The insertion of the centrifugal flow compressor bundle into the compressor casing, and the removal of the bundle from the casing is a difficult task due to the massive size and weight of these devices. For example, the compressor bundle may vary in weight from about 5,000 pounds to about 70,000 pounds. The bundle is an annular member which inserts into an annular cavity formed in the casing. There is a close tolerance between the outer annular surface of the bundle and the mating inner annular surface of the cavity. In addition, the mating annular surfaces of these devices are stepped, i.e. they have stepped diameter portions. Thus, the task of inserting the bundle into the casing and removing the bundle from the casing, is difficult to achieve with the precision needed to accomplish the task and avoid damage to the mating members.

The assembly difficulty is greatest when the step is large between the non pressurized portion of the case and the pressure containing section. Normal lifting, by slings and hoists cannot be accomplished due to the center of gravity of the bundle being inside the case before the bundle can be inserted into the pressure containing portion of the case. Since the normal methods of insertion cannot provide a support on both sides of the center of gravity, the bundle will tip and not be able to be inserted into the stepped section. There is no known support system built into the non-pressure containing portion of the case to provide the support and guidance of the stepped bundle to mate with the stepped portion of the case.

In U.S. Pat. No. 4,925,363, a roller bearing is located at one end of a support shaft and a flange is located at the other end along with insertable shims of different thicknesses which can be used to adjust the length of the support shaft. This arrangement provides support to the inner casing of a turbine or compressor during assembly or disassembly, and permits removal of the casing without removal of the turbine or compressor rotator. The inner casing can be rolled around the turbine circumference with the aid of large chain hoists.

In U.S. Pat. No. 3,493,212, a roller bearing is at one end of a support shaft and a flange at the other end, but uses jackscrews instead of insertable shims to allow the adjustment of its length.

In U.S. Pat. No. 5,326,222, the shaft of a turbine is supported while it is running, and is connected to the turbine shaft bearing casing by means of a pin joint. The device is adjustable and is built into the casing of the turbine but is not assist in the assembly or disassembly of the turbine.

Therefore, what is needed is a system for supporting a centrifugal flow compressor bundle during its removal from and insertion into the compressor casing, which is capable of supporting the massive compressor bundle for precise movement relative to the casing.

SUMMARY

One embodiment, accordingly, provides an apparatus and a method of precisely locating the compressor bundle relative to the cavity in the casing, and supporting the compressor bundle during installation or removal of the compressor bundle. To this end, a rotary machine includes a casing having an annular cavity. The cavity is stepped to include a first circumferential surface of a first size and a second circumferential surface of a second size, less than the first size. At least one roller member is retractably mounted in the casing and is adjustable between a first position and a second position. In the first position, the roller member is retracted from the cavity and is substantially aligned with the first circumferential surface. In the second position, the roller is extended into the cavity substantially and is aligned with the second circumferential surface.

A principal advantage of this embodiment is the roller member can be extended and retracted to rollingly support various diameter portions of the compressor bundle in alignment with the cavity of the compressor casing during insertion or withdrawal of the bundle relative to the casing.

DETAILED DESCRIPTION OF THE PREFERRED EMBODIMENT

Figure 1:
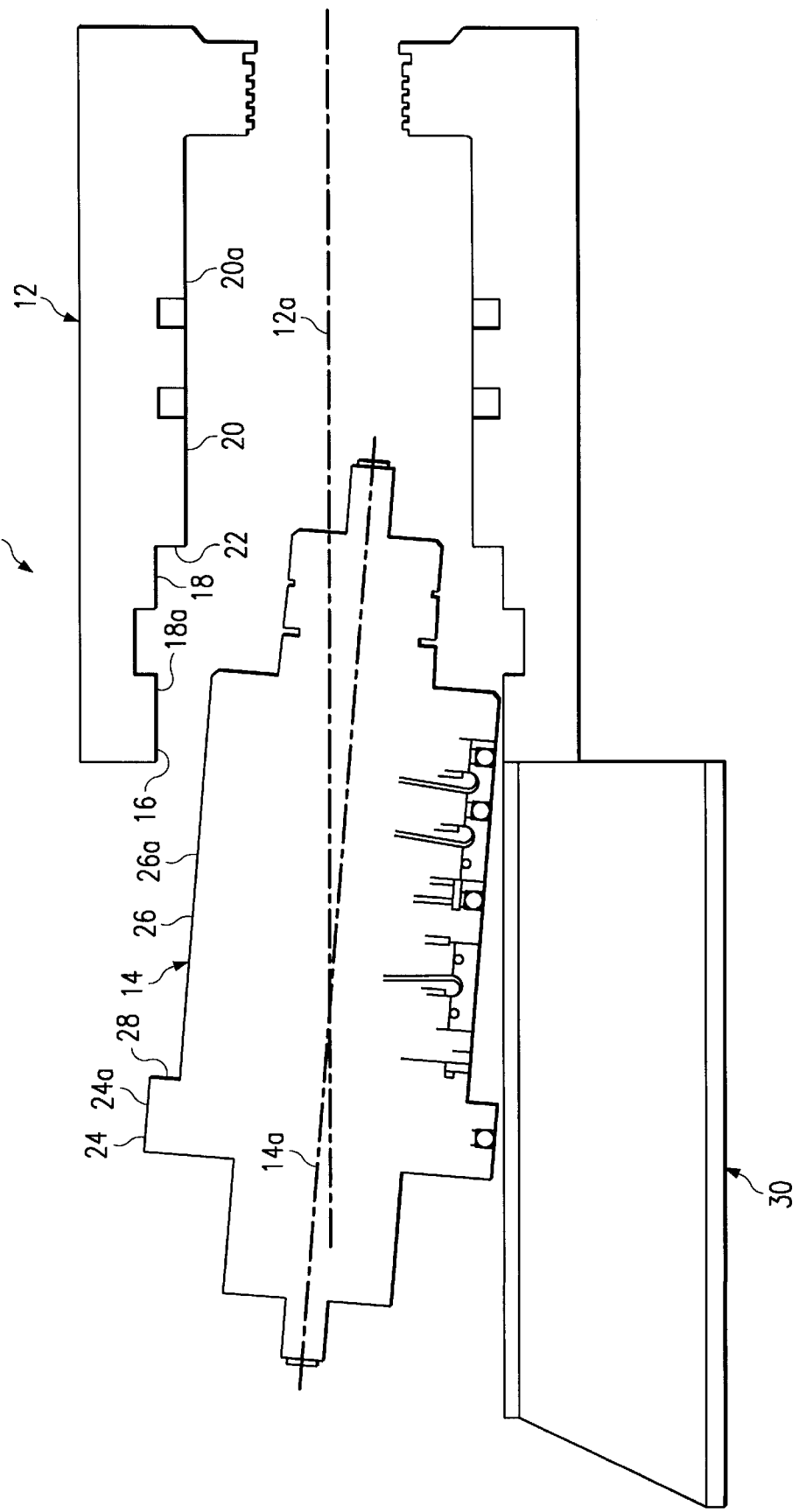
FIG. 1 is a diagrammatic side view illustrating an embodiment of a compressor bundle being installed or withdrawn relative to a compressor casing.

A rotary machine such as a compressor is generally designated 10 in FIG. 1 and includes a compressor casing 12 and a compressor bundle 14. Casing 12 includes an annular cavity 16 formed therein. Cavity 16 is stepped to include a first annular portion 18 and a second annular portion 20. The first annular portion 18 is of a first diameter size and the second annular portion 20 is of a second diameter size, less than the first size. The first annular portion 18 includes a first circumferential surface 18a, and the second annular portion 20 includes a second circumferential surface 20a. A land 22 separates the first annular portion 18 from the second annular portion 20.

The compressor bundle 14 is also stepped to include a first annular portion 24 of substantially the first size and a second annular portion 26 substantially of the second size. The first annular portion 24 includes a first circumferential surface 24a, and the second annular portion 26 includes a second circumferential surface 26a. By substantially the first size and substantially the second size is meant that, the first annular portion 24 of the compressor bundle 14 and the second annular portion 26 of the compressor bundle 14, have a close tolerance fit within the first annular portion 18 of the cavity 16 and the second annular portion 20, of the cavity 16, respectively. A land 28, separates the first annular portion 24 from the second annular portion 26.

Insertion of the compressor bundle 14 into the casing 12, or removal of the compressor bundle 14 from casing 12, requires that the second or smaller diameter portion 26 of the compressor bundle 14 be substantially aligned with the second or smaller diameter portion 20 of cavity 16. This also requires that the first, or relatively larger diameter portion 24 of the compressor bundle 14 be substantially aligned with the first or relatively larger diameter portion 18 of cavity 16. This, coupled with the above-mentioned close tolerance fit of the first annular portion 24 of the compressor bundle 14 and the second annular portion 26 of the compressor bundle 14, within the first annular portion 18 of the cavity 16 and the second annular portion 20, of the cavity 16, respectively, permits insertion and removal of compressor bundle 14 relative to compressor casing 12. This is achievable by coaxial alignment of the centroidal axis 14a of compressor bundle 14 with the centroidal axis 12a of casing 12. As illustrated in FIG. 1, the centroidal axis is 14a of compressor bundle 14 is not in coaxial alignment with the centroidal axis 12a of compressor casing 12. A cradle 30 is used to position compressor bundle 14 adjacent compressor casing 12. However, due to the stepped configuration of the first and second circumferential surfaces 24a, 26a of compressor bundle 14, axes 14a and 12a are out of alignment and in order to achieve alignment, the second annular portion 26 of compressor bundle 14 must be moved to substantially align second circumferential surface 26a of compressor bundle 14 with second circumferential surface 20a of compressor casing 12.

Figure 2:
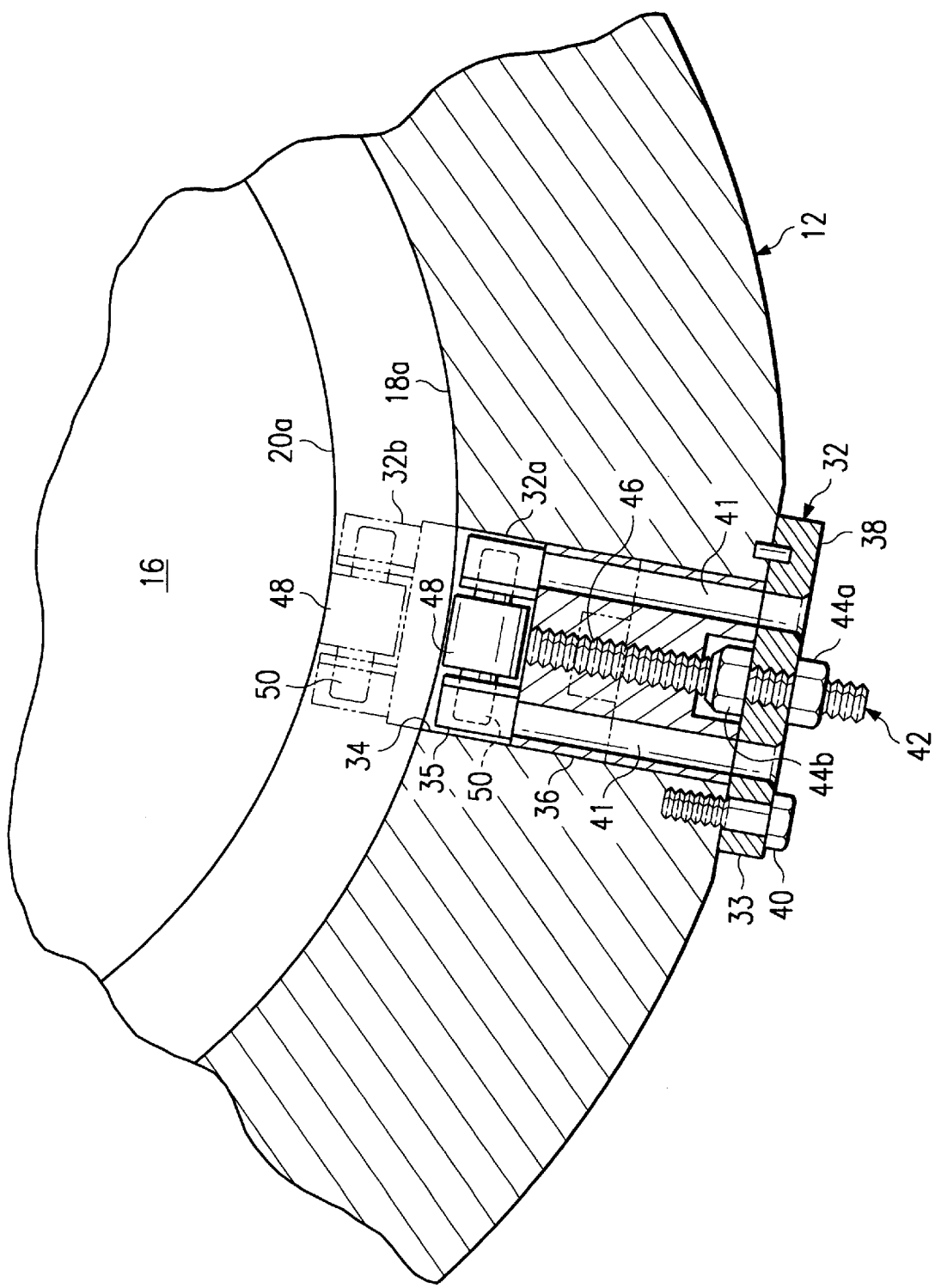
FIG. 2 is a partial cross-sectional view illustrating an embodiment of a compressor casing having a roller member mounted therein.

This is accomplished, according to this invention, by means of a roller member 32, FIG. 2, which is adjustable between a first or retracted position 32a withdrawn from cavity 16, and a second or extended position 32b extended into cavity 16. As illustrated, an opening 34 is formed in casing 12 and a body portion 36 of roller member 32 is inserted into opening 34. A cap member 38 is mounted on first end 33 of body portion 36 and secured to casing 12 by a plurality of capscrews 40, only one of which is illustrated. A pair of dowel pins 41 inserted through cap member 38 and body portion 36 of roller member 32, function as anti-rotation members to interconnect cap member 38 and body portion 36. A jackscrew device 42 is mounted in roller member 32 and includes a pair of captive nuts 44a, 44b threadably engaged with a threaded rod 46. A roller 48 is rotatably mounted on an axle 50 and retained on a second end 35 of roller member 32. Jackscrew device 42 functions in the usual manner in roller member 32 and is bi-directionally rotatable to extend roller 48 into the extended position 32b and to retract roller 48 into the retracted position 32a. When mounted in casing 12 and in the extended position 32b, roller member 32 positions roller 48 substantially in alignment with second circumferential surface 20a. When in the retracted position 32a, roller member 32 positions roller 48 substantially in alignment with first circumferential surface 18a.

Figure 3:
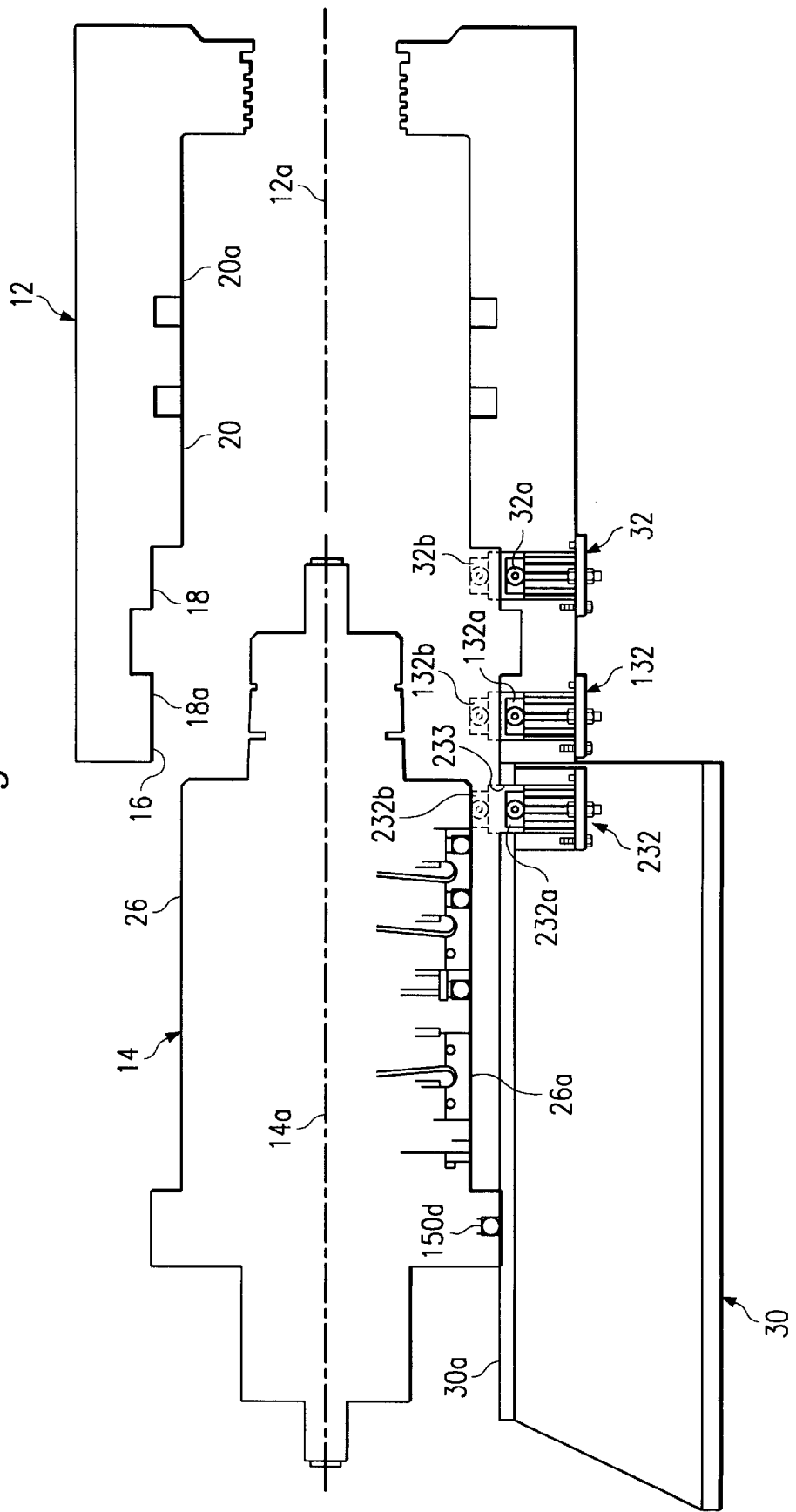
FIGS. 3–8 are diagrammatic side views illustrating an embodiment of a compressor bundle supported by a cradle and progressively being inserted into a compressor casing aided by extendable and retractable roller members.

A pair of identical roller members 32 and 132, FIG. 3, are mounted in an adjacent relationship in the first portion 18 of casing 12. In this configuration, both roller members 32 and 132 are movable between the retracted position 32a and 132a, substantially in alignment with surface 18a, and the extended position 32b and 132b, substantially in alignment with surface 20a. In addition, another such roller member 232 is mounted and secured in an opening 233 in cradle 30 and is movable between a retracted position 232a, substantially in alignment with a surface 30a of cradle 30 and with surface 18a, and an extended position 232b, substantially in alignment with surface 20a. As it can be seen in FIG. 3, compressor bundle 14 can be positioned so that axes 14a of compressor bundle 14 and 12a of compressor casing 12 are coaxially aligned. In this manner, compressor bundle 14 is positioned for insertion into cavity 16 of compressor casing 12. Second portion 26 of compressor bundle 14 is positioned for close tolerance insertion into second portion 20 of cavity 16. Rollers 32, 132 and 232 are serially positioned to support second portion 26 of compressor bundle 14 during the insertion process.

Figure 4:
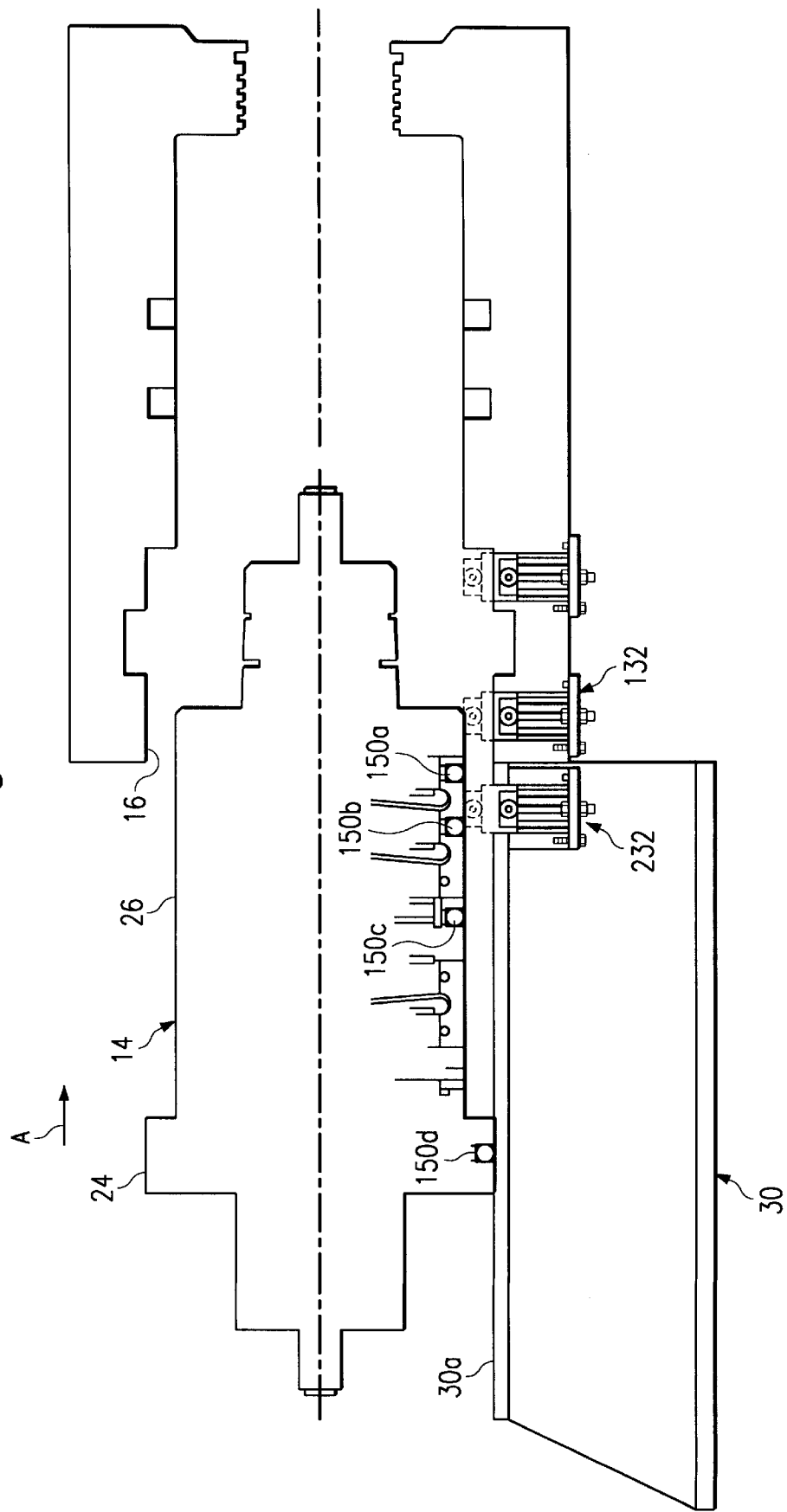

In FIG. 4, compressor bundle 14 is moved in the direction of an arrow designated A into cavity 16 such that roller members 132 and 232 are extended to engage and rollingly support second portion 26 of compressor bundle 14. Rolling is enhanced due to a plurality of rollers 50a, 50b and 50c rotatably mounted in second portion 26 of compressor bundle 14 and a roller 50d rotatably mounted in first portion 24 of compressor bundle 14 and engaged with surface 30a of cradle 30.

Figure 2A:
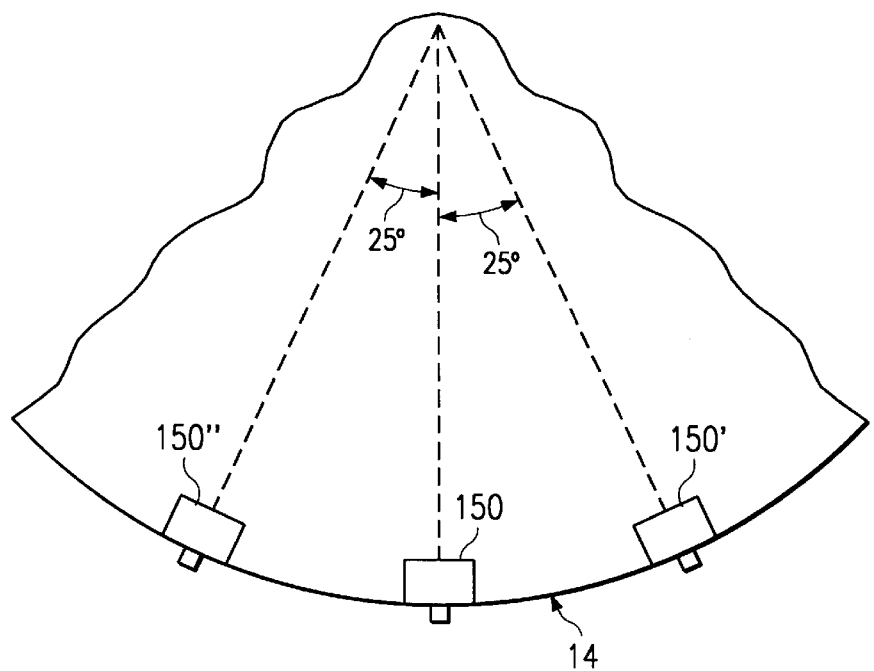
FIGS. 2a and 2b are partial diagrammatic cross-sectional views illustrating embodiments of a compressor bundle having circumferentially spaced roller members mounted thereon.
Figure 2B:
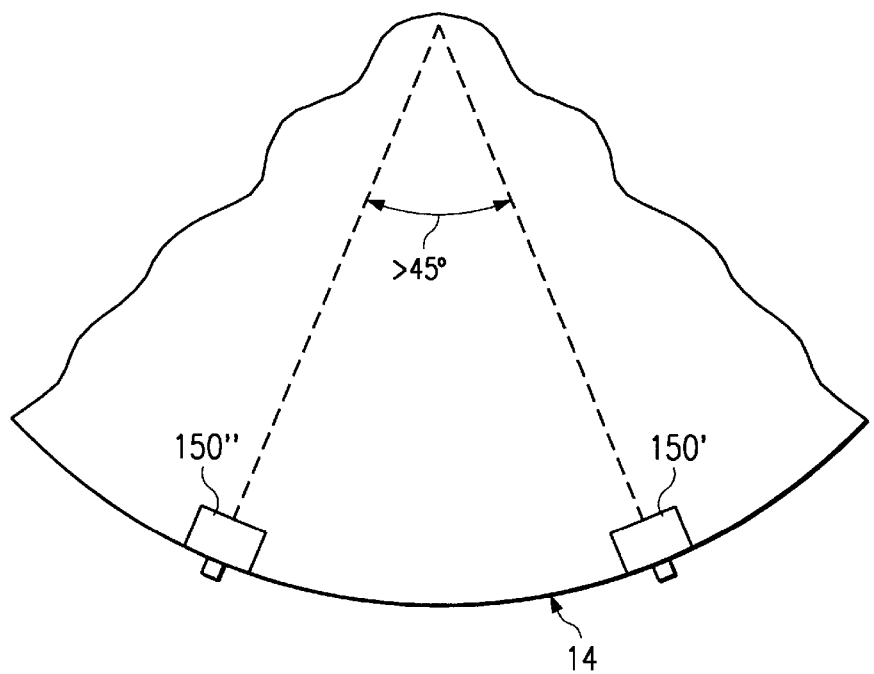

There can be one or more roller assemblies at various axial positions along the compressor bundle 14. For example, a bottom roller member 150 may be placed at bottom center, FIG. 2a, and additional roller members 150',150", can be circumferentially spaced, from the bottom roller member 150, to support the weight of compressor bundle 14 and provide stability for handling. A preferred circumferential spacing angle is less than 45° from the bottom roller member 150, e.g. about 25°. Alternatively, FIG. 2b illustrates an embodiment of compressor bundle 14 including two roller members 150',150", with the bottom roller member 150 being eliminated and a circumferential spacing angle of less than 45°.

Figure 5:
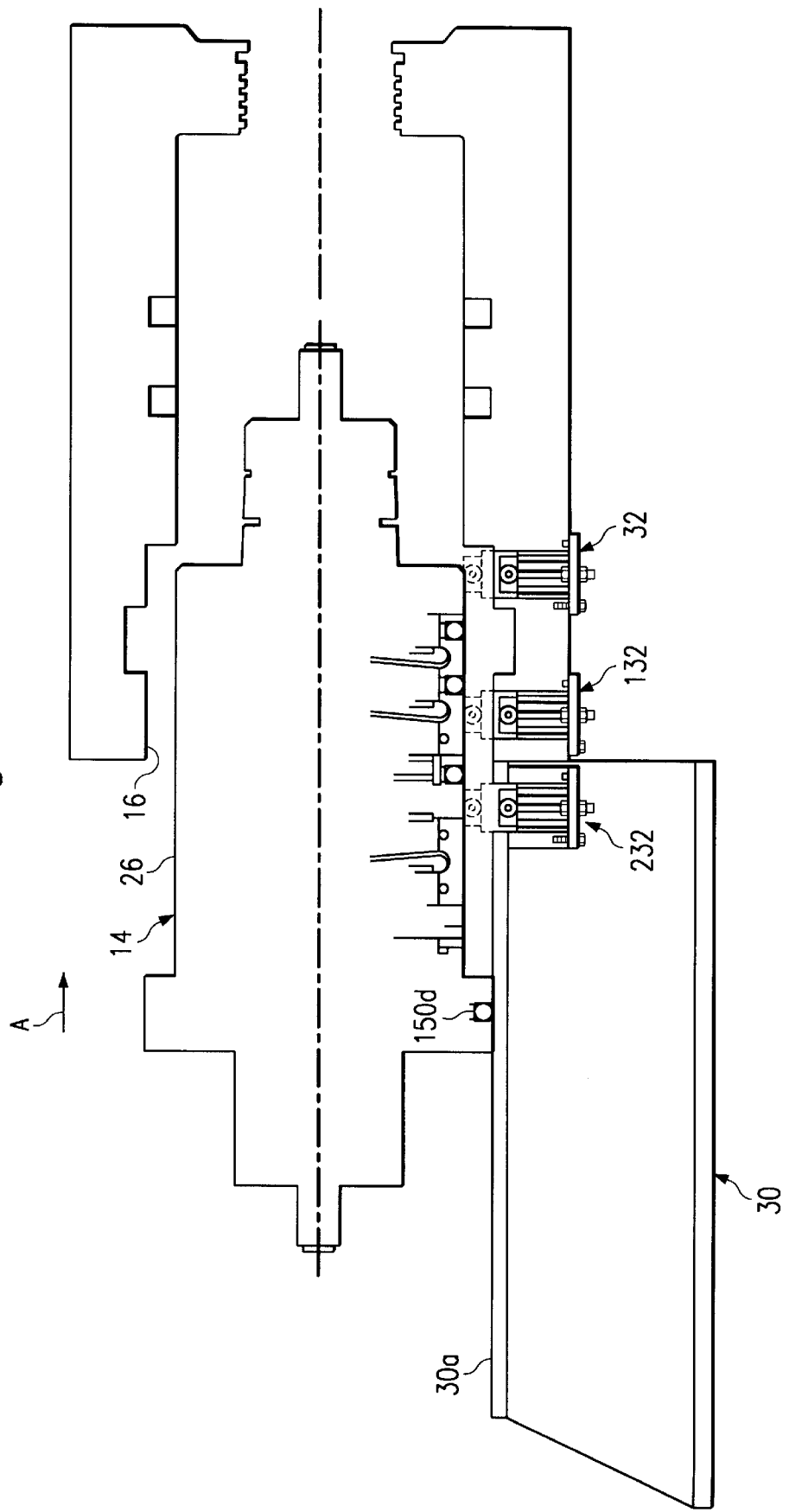
Figure 6:
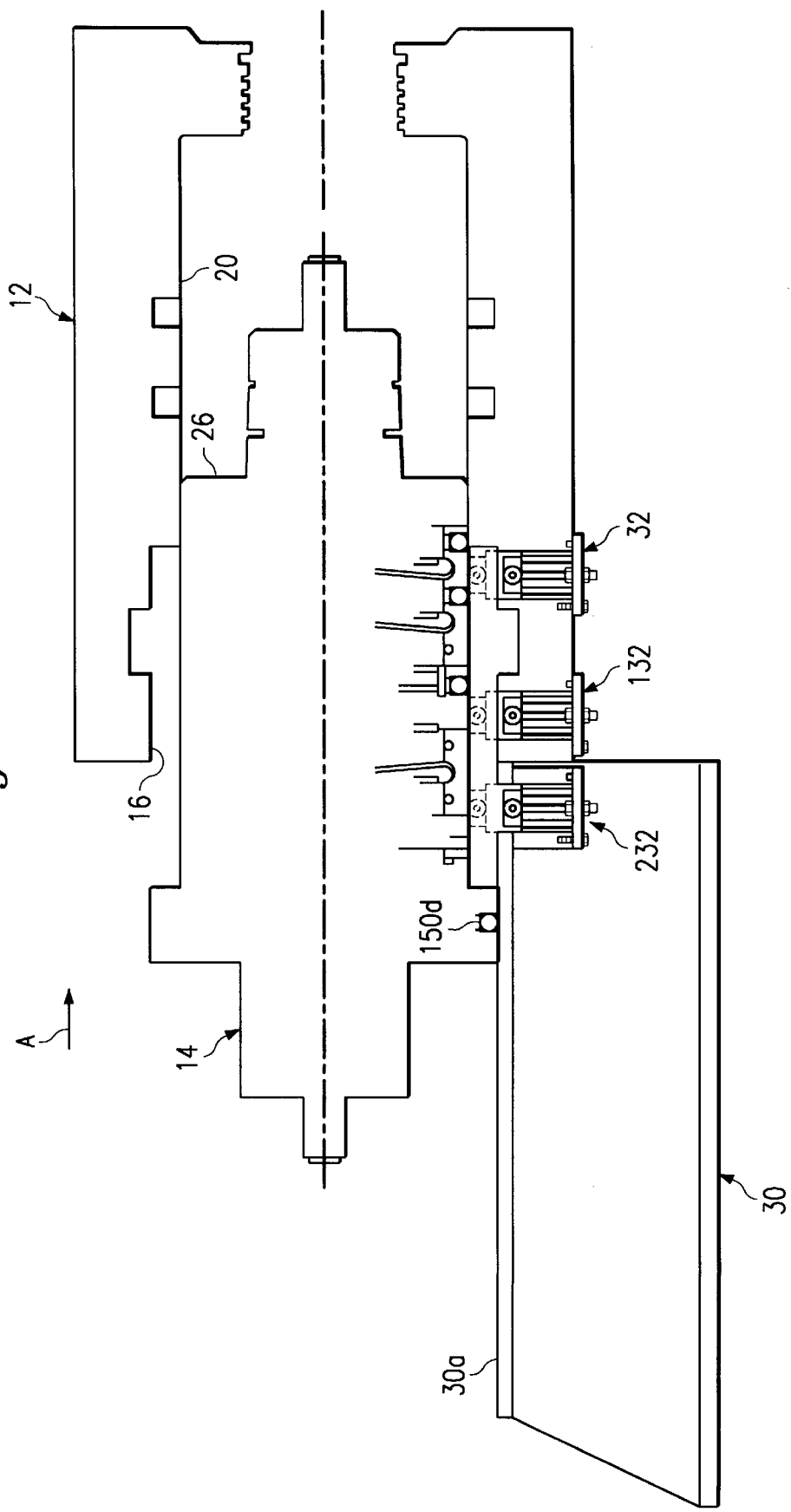

In FIG. 5, compressor bundle 14 is moved further in the direction of arrow A into cavity 16 such that roller members 32, 132 and 232 are extended to engage and rollingly support second portion 26 of compressor bundle 14 and roller 50d is engaged with surface 30a of cradle 30. Further movement of compressor bundle 14 in the direction of arrow A into cavity 16, FIG. 6, positions second portion 26 of compressor bundle 14 in second portion 20 of casing 12. Roller members 32, 132 and 232 are extended to engage and rollingly support second portion 26 of compressor bundle 14 and roller 50d is engaged with surface 30a of cradle 30.

Figure 7:
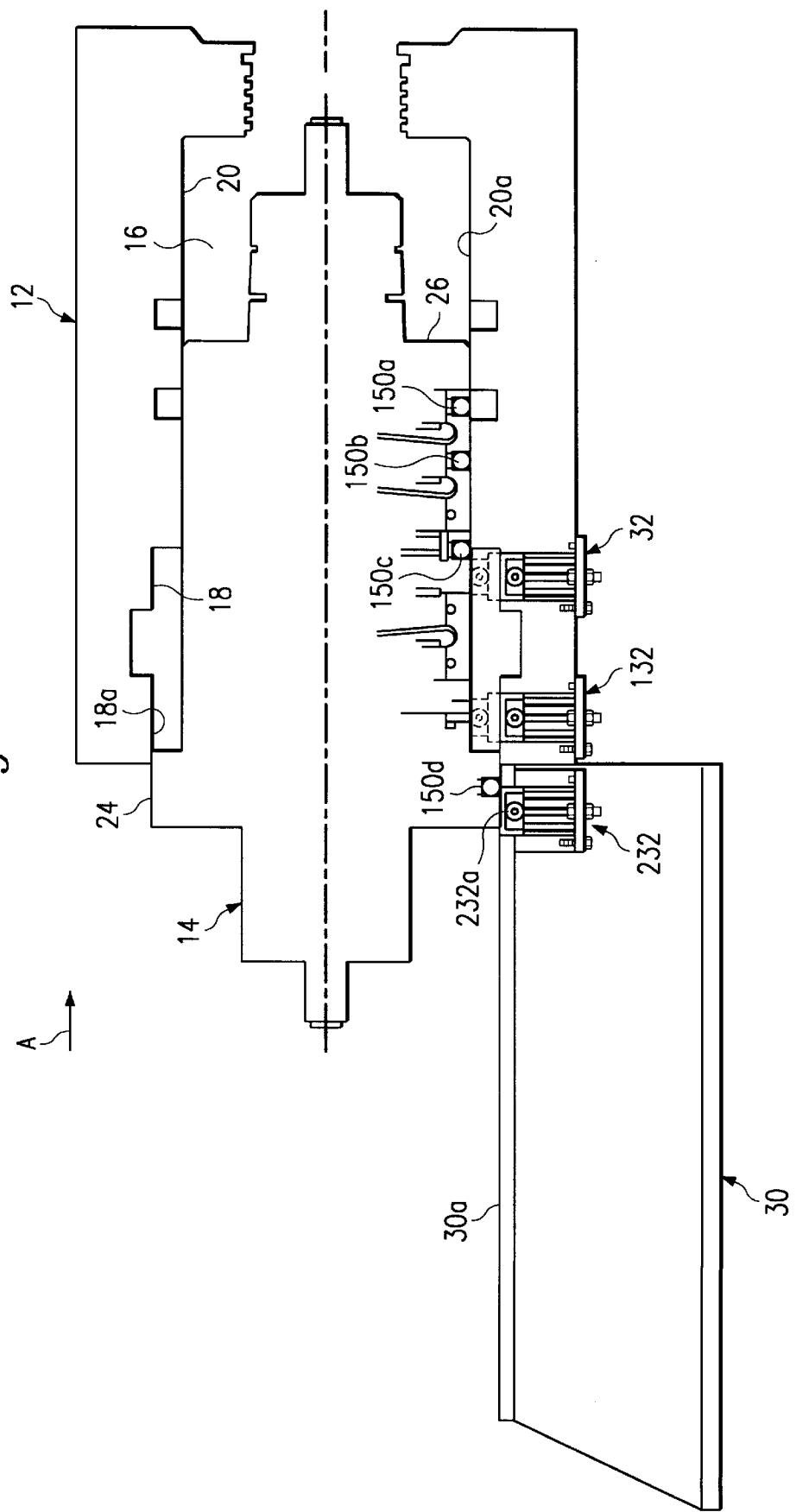

Continued movement of compressor bundle 14 in the direction of arrow A into cavity 16, FIG. 7, positions second portion 26 of compressor bundle 14 further into second portion 20 of casing 12. Roller members 32 and 132 engage and rollingly support second portion 26 of compressor bundle 14 and roller 50d is engaged with surface 30a of cradle 30. Also, roller member 232 is retracted into retracted position 232a substantially aligned with surface 30a of cradle 30 and with surface 18a of first portion 18 of casing 12. Also rollers 50a, 50b and 50c rotatably engage surface 20a of second portion 20 of casing 12. First portion 18 of casing 12 is positioned in first portion 24 of compressor bundle 14.

Figure 8:
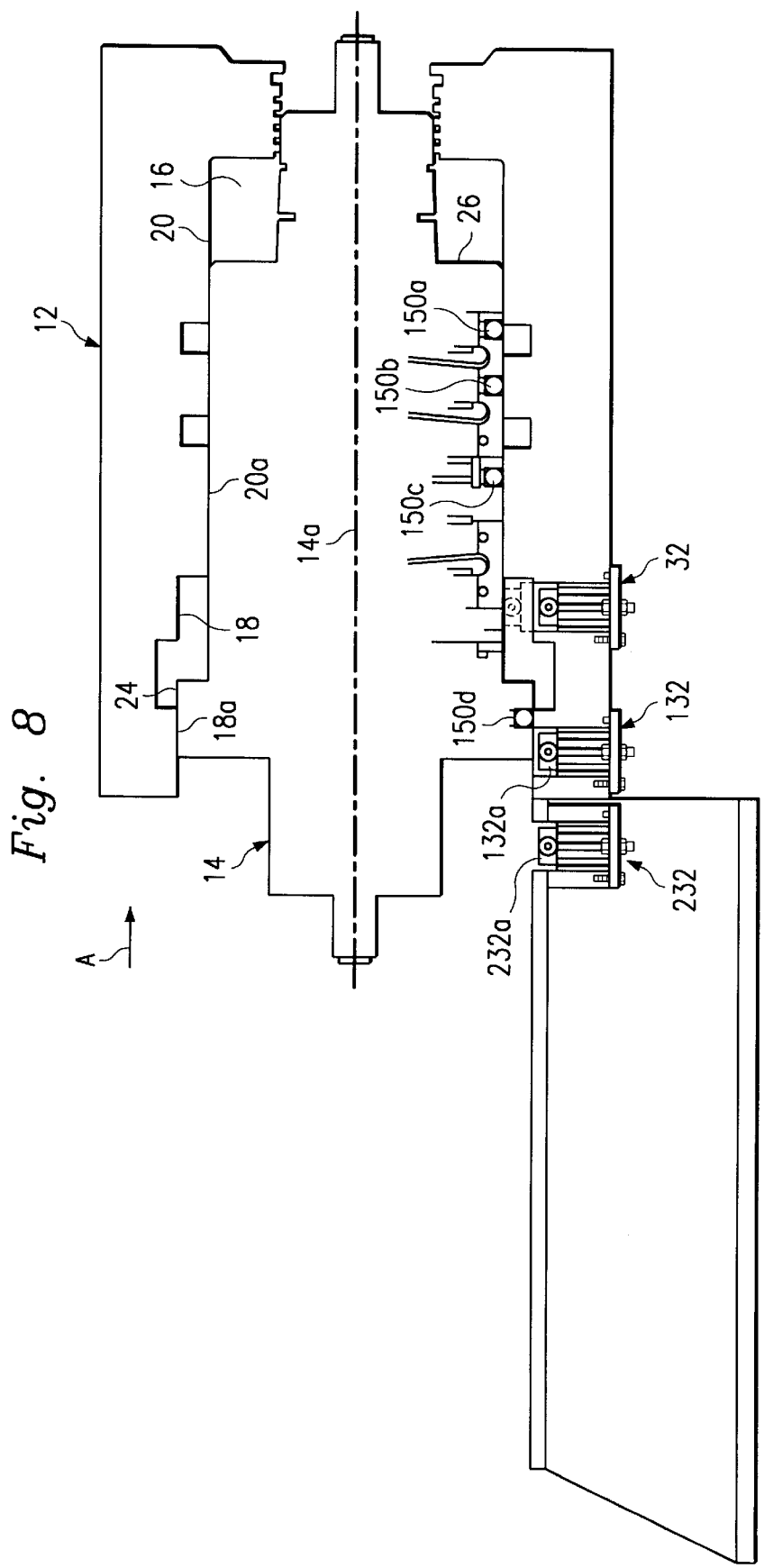

Still further movement of compressor bundle 14 in the direction of arrow A into cavity 16, FIG. 8, positions second portion 26 of compressor bundle 14 further into second portion 20 of casing 12. Roller member 32 engages and rollingly supports second portion 26 of compressor bundle 14 and roller 50d is engaged with surface 18a of first portion 18. Also, roller member 132 and 232 are retracted into position 132a and 232a, respectively, substantially aligned with surface 18a of first portion 18 of casing 12. Also, roller 50a, 50b and 50c rotatably engage surface 20a of second portion 20 of casing 12. First portion 18 of casing 12 is positioned in first portion 24 of compressor bundle 14. Although not illustrated, when fully seated in cavity 16 of compressor casing 12, land 28 of compressor bundle 14 is immediately adjacent to land 22 of compressor casing 12. Also, roller member 32 is retracted to position 32a and roller 50d is positioned adjacent roller member 32.

Withdrawal of compressor bundle 14 from cavity 16 of compressor casing 12 is accomplished by timely extension of roller members 32, 132 and 232 to provide support for second section 26 of compressor bundle 14 and maintain axes 14a and 12a coaxially aligned. When completely withdrawn, as illustrated in FIG. 3, roller member 232 is in extended position 232a to engage surface 26a of second section 26 and roller member 50d is engaged with surface 30a of cradle 30. As such, axes 14a and 12a are coaxially aligned.

As it can be seen, the principal advantages of these embodiments include a roller member which can be extended and retracted to rollingly support various diameter portions of the compressor bundle in alignment with the cavity of the compressor casing during insertion or withdrawal of the bundle relative to the casing.

As such, one embodiment provides a rotary machine which comprises a casing having an annular cavity which is stepped to include a first circumferential surface of a first size and a second circumferential surface of a second, smaller size. At least one roller member is retractably mounted in the casing and is adjustable between a first position and a second position. In the first position, the roller member is retracted from the cavity and is substantially aligned with the first circumferential surface. In the second position, the roller member is extended into the cavity and is substantially aligned with the second circumferential surface.

Another embodiment provides a compressor which comprises a casing having an annular cavity which is stepped to include a first circumferential surface of a first size and a second circumferential surface of a second, smaller size. A compressor bundle is also stepped to include a first circumferential surface substantially of the first size, and a second circumferential surface substantially of the second size. At least one roller member is retractably mounted in the casing and is adjustably mounted in the casing and is adjustable between a first position and a second position. In the first position, the roller member is retracted from the cavity to rollingly support the first circumferential surface of the compressor bundle substantially in alignment with the first circumferential surface of the cavity. In the second position, the roller member is extended into the cavity to rollingly support the second circumferential surface of the compressor bundle substantially in alignment with the second circumferential surface of the cavity.

Still another embodiment provides an adjustable compressor bundle insertion and removal system comprising a casing having an annular cavity which is stepped to include a first circumferential surface of a first size and a second circumferential surface of a second, smaller size. A compressor bundle is also stepped to include a first circumferential surface substantially of the first size and a second circumferential surface substantially of the second size. A first roller member is retractably mounted in the casing and is adjustable between a first position and a second position. In the first position, the first roller member is retracted from the cavity to rollingly support the first circumferential surface of the compressor bundle substantially in alignment with the first circumferential surface of the cavity. In the second position, the first roller member is extended into the cavity to rollingly support the second circumferential surface of the compressor bundle substantially in alignment with the second circumferential surface of the cavity. A cradle includes a surface for supporting the compressor bundle adjacent the casing. A second roller member is retractably mounted in the cradle and is adjustable between a first position and a second position. In the first position, the second roller member is retracted adjacent the support surface to rollingly support the first circumferential surface of the compressor bundle substantially in alignment with the first circumferential surface of the cavity. In the second position, the second roller member is extended from the support surface to rollingly support the second circumferential surface of the compressor bundle substantially in alignment with the second circumferential surface of the cavity.

A further embodiment provides a method of maintaining a movable compressor bundle in alignment with a stationary compressor casing by forming an annular cavity in the compressor casing to be stepped to include a first annular portion of a first size and a second annular portion of a second, smaller size. Also, the compressor bundle is formed to be stepped to include a first annular portion substantially of the first size and a second annular portion substantially of the second size. A retractable roller member is mounted in the first annular portion of the casing. The roller member is retracted into the casing to receive and rollingly support the first annular portion of the compressor bundle substantially in alignment with the first annular portion of the compressor casing. The roller member is extended into the cavity to receive and rollingly support the second annular portion of the compressor bundle substantially in alignment with the second annular portion of the compressor casing.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A rotary machine comprising:
    a casing having an annular cavity formed therein, the cavity being stepped to include a first circumferential surface of a first size and a second circumferential surface of a second size, less than the first size; and
    at least one roller member retractably mounted in the casing, the roller member being adjustable between a first position, wherein the roller member is retracted from the cavity and is substantially aligned with the first circumferential surface, and a second position, wherein the roller member is extended into the cavity and is substantially aligned with the second circumferential surface.

2. The rotary machine as defined in claim 1 further comprising another roller member retractably mounted in the casing adjacent the at least one roller member, the another roller member being adjustable between a first position wherein the another roller member is retracted from the cavity and is substantially aligned with the first circumferential surface and a second position wherein the another roller member is extended into the cavity and is substantially aligned with the second circumferential surface.

3. The rotary machine as defined in claim 1 wherein the at least one roller member is mounted in a jackscrew assembly.

4. The rotary machine as defined in claim 3 wherein the jackscrew assembly is inserted into an opening formed in the casing, and the jackscrew assembly is secured to the casing.

5. The compressor as defined in claim 3, further comprising another roller member retractably mounted in the casing adjacent the at least one roller member, the another roller member being adjustable between a first position, wherein the another roller member is retracted from the cavity to rollingly support the first circumferential surface of the compressor bundle substantially in alignment with the first circumferential surface of the cavity, and a second position, wherein the another roller member is extended into the cavity to rollingly support the second circumferential surface of the compressor bundle substantially in alignment with the second circumferential surface of the cavity.

6. A compressor comprising:

a casing having an annular cavity formed therein, the cavity being stepped to include a first circumferential surface of a first size, and a second circumferential surface of a second size, less than the first size;

a compressor bundle being stepped to include a first circumferential surface substantially of the first size, and a second circumferential surface substantially of the second size; and at least one roller member retractably mounted in the casing, the roller member being adjustable between a first position, wherein the roller member is retracted from the cavity to rollingly support the first circumferential surface of the compressor bundle substantially in alignment with the first circumferential surface of the cavity, and a second position, wherein the roller member is extended into the cavity to rollingly support the second circumferential surface of the compressor bundle substantially in alignment with the second circumferential surface of the cavity.

7. The compressor as defined in claim 5 wherein the at least one roller member is mounted in a jackscrew assembly.

8. The compressor as defined in claim 7 wherein the jackscrew assembly is inserted into an opening formed in the casing, and the jackscrew assembly is secured to the casing.

9. The compressor as defined in claim 5 wherein the compressor bundle includes a plurality of rollers mounted thereon, the plurality of rollers including at least one roller mounted in the first circumferential surface of the compressor bundle, and at least another roller mounted in the second circumferential surface of the compressor bundle.

10. The compressor as defined in claim 9 wherein the at least one roller mounted in the first circumferential surface of the compressor bundle is positioned to rollingly engage the first circumferential surface of the casing, and the at least another roller mounted in the second circumferential surface of the compressor bundle is positioned to rollingly engage the second circumferential surface of the casing.

11. An adjustable compressor bundle insertion and removal system comprising:

a casing having an annular cavity formed therein, the cavity being stepped to include a first circumferential surface of a first size and a second circumferential surface of a second size, less than the first size;

a compressor bundle being stepped to include a first circumferential surface substantially of the first size and a second circumferential surface substantially of the second size;

a first roller member retractably mounted in the casing, the first roller member being adjustable between a first position, wherein the first roller member is retracted from the cavity to rollingly support the first circumferential surface of the compressor bundle substantially in alignment with the first circumferential surface of the cavity, and a second position, wherein the first roller member is extended into the cavity to rollingly support the second circumferential surface of the compressor bundle substantially in alignment with the second circumferential surface of the cavity;

a cradle having a support surface for supporting the compressor bundle adjacent the casing; and a second roller member retractably mounted on the cradle, the second roller member being adjustable between a first position, wherein the second roller member is retracted to a position adjacent the support surface to rollingly support the first circumferential surface of the compressor bundle substantially in alignment with the first circumferential surface of the cavity, and a second position wherein the second roller member is extended from the support surface to rollingly support the second circumferential surface of the compressor bundle substantially in alignment with the second circumferential surface of the cavity.

12. The system as defined in claim 11 wherein the first roller member is mounted in a jackscrew assembly.

13. The system as defined in claim 12 wherein the jackscrew assembly is inserted into an opening formed in the casing, and the jackscrew assembly is secured to the casing.

14. The system as defined in claim 11 wherein the first and second roller members are each mounted in a respective jackscrew assembly.

15. The system as defined in claim 14 wherein the jackscrew assembly of the first roller member is inserted into an opening formed in the casing and is secured to the casing.

16. The system as defined in claim 15 wherein the jackscrew assembly of the second roller member is inserted into an opening in the cradle and is secured to the cradle.

17. The system as defined in claim 11 further comprising a third roller member retractably mounted in the casing adjacent the first roller member, the third roller member being adjustable between a first position, wherein the third roller member is retracted from the cavity to rollingly support the first circumferential surface of the compressor bundle substantially in alignment with the first circumferential surface of the cavity, and a second position, wherein the third roller member is extended into the cavity to rollingly support the second circumferential surface of the compressor bundle substantially in alignment with the second circumferential surface of the cavity.

18. The system as defined in claim 17 wherein the first, second and third roller members are each mounted in a respective jackscrew assembly.

19. The system as defined in claim 18 wherein the jackscrew assembly of each of the first and third roller members are inserted into an opening formed in the casing and are secured to the casing.

20. The system as defined in claim 19 wherein the jackscrew assembly of the second roller member is inserted into an opening in the cradle and is secured to the cradle.

21. A method of maintaining a movable compressor bundle in alignment with a stationary compressor casing comprising the steps of:

forming an annular cavity in the compressor casing to be stepped to include a first annular portion of a first size and a second annular portion of a second size, less than the first size;

forming the compressor bundle to be stepped to include a first annular portion substantially of the first size and a second annular portion substantially of the second size;

mounting a retractable roller member in the first annular portion of the casing;

retracting the roller member into the casing to receive and rollingly support the first annular portion of the compressor bundle substantially in alignment with the first annular portion of the compressor casing; and extending the roller member into the cavity to receive and rollingly support the second annular portion of the compressor bundle substantially in alignment with the second annular portion of the compressor casing.

22. The method as defined in claim 21 wherein the step of mounting the retractable roller member in the first annular portion of the casing includes the further steps of mounting the roller member in a jackscrew assembly, inserting the jackscrew assembly into an opening formed in the casing, and securing the jackscrew assembly onto the casing.

* * * * *